(12) United States Patent
Sanders et al.

(10) Patent No.: US 9,303,504 B2
(45) Date of Patent: Apr. 5, 2016

(54) IN-SITU ARTIFICIAL PRESSURIZATION OF A WELL WITH CARBON DIOXIDE RECYCLING TO INCREASE OIL PRODUCTION

(71) Applicants: James Kenneth Sanders, Lubbock, TX (US); Duck Joo Yang, Flower Mound, TX (US)

(72) Inventors: James Kenneth Sanders, Lubbock, TX (US); Duck Joo Yang, Flower Mound, TX (US)

(73) Assignees: James K. and Mary A. Sanders Family LLC, Lubbock, TX (US); Duck Joo Yang, Flower Mound, TX (US)

( * ) Notice: Subject to any disclaimer, the term of this patent is extended or adjusted under 35 U.S.C. 154(b) by 281 days.

(21) Appl. No.: 13/772,575

(22) Filed: Feb. 21, 2013

(65) Prior Publication Data

US 2014/0231080 A1    Aug. 21, 2014

(51) Int. Cl.
 *E21B 43/40*    (2006.01)
 *E21B 43/16*    (2006.01)
 *C09K 8/594*    (2006.01)

(52) U.S. Cl.
 CPC ............... *E21B 43/40* (2013.01); *C09K 8/594* (2013.01); *E21B 43/164* (2013.01)

(58) Field of Classification Search
 CPC ....... E21B 43/40; E21B 43/16; E21B 43/164; C09K 8/594
 See application file for complete search history.

(56) References Cited

U.S. PATENT DOCUMENTS

| | | |
|---|---|---|
| 3,811,504 A | 5/1974 | Flournoy et al. |
| 3,811,505 A | 5/1974 | Flournoy et al. |
| 3,902,556 A | 9/1975 | Tate |
| 3,921,718 A | 11/1975 | Tate et al. |
| 4,366,864 A | 1/1983 | Gibson et al. |
| 4,895,206 A | 1/1990 | Price |
| 5,330,662 A | 7/1994 | Jahnke et al. |
| 2002/0028750 A1 | 3/2002 | Dobson et al. |
| 2009/0071648 A1 | 3/2009 | Hagen et al. |

OTHER PUBLICATIONS

U.S. Office Action mailed Feb. 23, 2012 corresponding to U.S. Appl. No. 13/113,365, filed May 23, 2011.

*Primary Examiner* — Zakiya W Bates
(74) *Attorney, Agent, or Firm* — Amin, Turocy & Watson, LLP

(57) ABSTRACT

Systems and methods utilize bicarbonate and acid to form carbon dioxide in a well (e.g., an oil well) to increase pressure in the well to facilitate production of oil and other resources, such as hydrocarbons, from the well. The well can be a closed system that facilitates absorption of the carbon dioxide into the oil resource. After the carbon dioxide is absorbed within the oil, the oil containing the carbon dioxide can be produced by the well. The carbon dioxide can be recycled after the resource is mined from the well to create bicarbonate that subsequently can be used with acid to facilitate the production from the well.

20 Claims, 9 Drawing Sheets

IN-SITU ARTIFICIAL PRESSURIZATION OF A WELL WITH CARBON DIOXIDE RECYCLING TO INCREASE OIL PRODUCTION

TECHNICAL FIELD

This disclosure generally relates to increasing production of oil and other resources, such as hydrocarbons, from a well and more specifically relates to the use of in-situ artificial pressurization including recycling of carbon dioxide gas to facilitate economical removal of oil and other resources, such as hydrocarbons, from the well.

BACKGROUND

Oil wells are formed from boreholes drilled into a porous, subterranean rock formation containing petroleum. These porous, subterranean rock formations are referred to as "reservoirs." Often, a reservoir is located beneath a less permeable rock layer that traps the reservoir under pressure. In reservoirs under newly developed production, pressure naturally present within the reservoir provides force to allow for the migration of petroleum from the petroleum bearing rock into the borehole forming the oil well. As an oil well produces, pressure subsides until a point is reached where production is no longer economically sustainable, and the oil well is typically abandoned.

An abandoned oil well can potentially contain over half of the original amount of oil in the reservoir; however, a lack of pressure in the reservoir makes continued operation of the oil well economically unproductive without further intervention. Several secondary and tertiary recovery methods have been used to recover additional oil. One method is to inject water or a gas (such as $CO_2$ or nitrogen) into the reservoir to create additional pressure. Polymers and surfactants have also been employed to lower the viscosity of petroleum remaining in the reservoir and aid in petroleum flow. However, such methods are typically costly or potentially impractical in cases where materials are expensive and/or large amounts of water are not locally available.

SUMMARY

The following presents a simplified summary to provide a basic understanding of some aspects of the subject disclosure. This summary is not an extensive overview of the disclosed subject matter. It is intended to neither identify key or critical elements of the disclosed subject matter, nor is it intended to delineate the scope of the disclosed subject matter or the claims. Its sole purpose is to present some concepts of the disclosed subject matter in a simplified form as a prelude to the more detailed description that is presented later.

The systems and methods described herein generally provide for low-cost recovery of additional petroleum from dormant wells. The systems and methods also enhance the petroleum production from active wells in an economically efficient manner. The techniques can provide artificial pressurization to facilitate extraction of one or more resources from the well at a cost less than previous further intervention techniques. Generally, pressure in the form of carbon dioxide gas is generated by reacting bicarbonate compound and an acid in a reservoir or in a water layer located under the reservoir. The carbon dioxide in the reservoir is absorbed into the oil and the carbon dioxide absorbed oil and not-absorbed carbon dioxide can be removed from the well. After removal, the absorbed carbon dioxide and not-absorbed carbon dioxide can be recycled to facilitate formation of further bicarbonate compound that can be used to provide further artificial pressurization of the reservoir. The recycling of carbon dioxide can decrease the use of acid (e.g., HCl) and carbonate compound (e.g., $Na_2CO_3$) and significantly reduce the operational costs of the artificial pressurization. To facilitate facile carbon dioxide absorption by oil, an amine compound having both hydrophobic and hydrophilic property such as alkyl hydroxy amine (e.g., tetra-ethyl ammonium hydroxide) can also be used. The amine compound can be injected to the well before or at the same time as injection of the bicarbonate solution.

In an aspect, a system is described that can revitalize or increase production of a well. The system includes a well that can produce a stream of resources and gas. The resources and the gas can be separated by a separator. The gas can include a carbon dioxide gas and a hydrocarbon gas. A reaction between a carbonate-containing solution that is held in the separator and the carbon dioxide gas component from the well occurs within the separator. The reaction produces bicarbonate that is injected into the well, optionally with an amine solution. An acid is then injected to the well to facilitate formation of carbon dioxide within the well. The well is sealed to facilitate absorption of carbon dioxide in the resource to facilitate removal of the resource and confine carbon dioxide within the well.

In another aspect, a method is described that can facilitate removal of a resource from a well. A bicarbonate solution spiked with an amine and an acid are injected in a well and combined. The bicarbonate and the acid react to generate a carbon dioxide. The carbon dioxide and the amine are absorbed into the resource within the well. The resource and the carbon dioxide are subsequently removed from the well. The well can be sealed to facilitate the absorption of the carbon dioxide into the resource and is opened after a pressure drop that indicates the carbon dioxide has absorbed into the resource. After the resource and the carbon dioxide are removed from the well maintaining a certain level of pressure, the carbon dioxide and hydrocarbon gas can be separated from the resource using a column separator: the carbon dioxide is reacted with a carbonate to form bicarbonate that is used with the acid in the well to form the carbon dioxide.

In a further aspect, another method is described that can facilitate removal of a resource from a well. Carbon dioxide is formed within the well from a bicarbonate and an acid in a well to facilitate an increase in pressure in the well. The well is closed to facilitate absorption of the carbon dioxide into a resource in the well to facilitate a decrease in a pressure of the well. After the absorption, the well is opened to facilitate removal of the resource and the carbon dioxide from the well maintaining a certain level of pressure. The removed carbon dioxide can be converted to the bicarbonate through a reaction with carbonate.

The following description and the annexed drawings set forth in detail certain illustrative aspects of the disclosed subject matter. These aspects are indicative, however, of a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF DRAWINGS

Non-limiting and non-exhaustive embodiments of the subject disclosure are described with reference to the following figures, wherein like reference numerals refer to like parts throughout the various views unless otherwise specified. Please read the ones I revised using method A.

DETAILED DESCRIPTION

Figure 1:
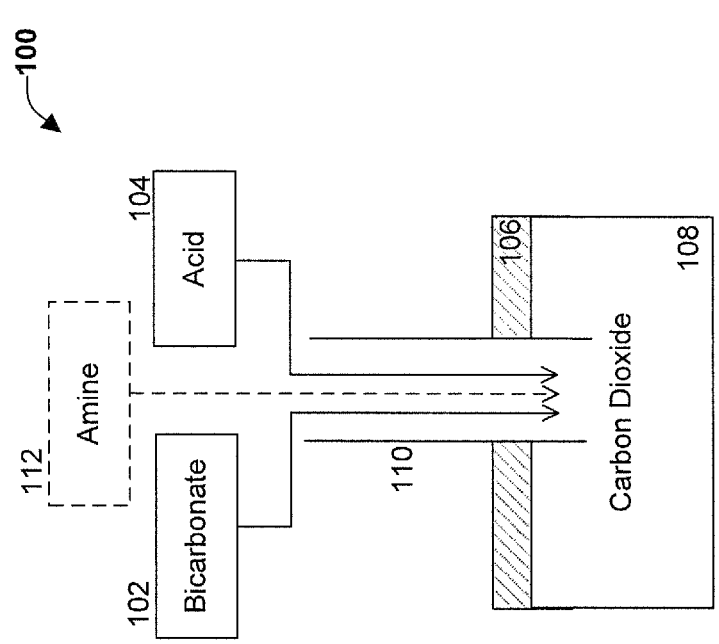
FIG. 1 is a schematic block diagram representation of a system for increasing resource production of a well, according to an aspect of the disclosure.

In the following description, numerous specific details are set forth to provide a thorough understanding of the embodiments of the subject disclosure. One skilled in the relevant art will recognize, however, that the embodiments described herein can be practiced without one or more of the specific details, or with other methods, components, materials, or the like. In other instances, well known structures, materials, or operations are not shown or described in detail to avoid obscuring certain aspects.

According to an aspect of the subject disclosure, described herein are systems and methods that provide in-situ artificial pressurization using recycled carbon dioxide that can facilitate extraction of one or more resources (e.g., oil and hydrocarbons) from a well. When used herein, for explanation purposes only, the term "well" refers to an oil well that can facilitate production of petroleum. The oil can be produced from the well with other hydrocarbons. It will be understood, however, that other types of wells and other types of resources can benefit from the artificial pressurization techniques described herein. An example of another type of well is a natural gas well that produces natural gas as the resource.

Petroleum deposits are typically located in a porous subterranean rock formation, or "reservoir," that is overlaid with a less porous rock formation or cap rock. The cap rock prevents petroleum/oil and gasses associated with petroleum/oil formation from escaping from the reservoir. As such, untapped, petroleum deposits in these reservoirs are often held in the reservoir under considerable pressure. An oil well uses the pressure present to extract the petroleum.

The oil well reaches the petroleum through a jacketed borehole that is drilled through the cap rock and into the reservoir. The jacket contains perforations so that the natural pressure within the reservoir causes the migration of petroleum into the borehole. As the well produces petroleum through the borehole, the pressure in the reservoir naturally decreases. The decrease in pressure in the reservoir limits the migration of the petroleum into the borehole and thereby decreases the rate of production of the well.

The well is considered no longer economically sustainable when the rate of production falls below a threshold. The threshold of economic sustainability is reached when the amount of money made from oil production is less than the associated costs of the oil production (operation costs and taxes). The reservoir associated with the economically unstable well still often contains oil even though the pressure has dropped.

As oil production of the well slows due to the pressure drop, it is possible to increase the oil production rate of the well through various secondary and tertiary techniques; however, these techniques also increase the operation costs. Secondary and tertiary techniques are often aimed at artificially increasing pressure of the reservoir by injection of water, gas or polymers into the reservoir. Operation of these artificial pressurization techniques is often prohibitively costly, such that the operational costs still outweigh the amount of money made from the oil production.

The systems and methods described herein can reduce the operational cost of artificial pressurization such that the well becomes economically sustainable. An acid and a bicarbonate can be injected into the reservoir so that carbon dioxide is formed within the well. Optionally, an amine can be injected into the reservoir with the bicarbonate. Additionally, the bicarbonate can be produced by reacting recycled carbon dioxide with a carbonate solution. The well can be sealed to facilitate absorption of the carbon dioxide in the oil. When the carbon dioxide has absorbed into the oil, the oil and carbon dioxide can be removed from the reservoir through the well. In other words, the well produces a stream of resource (e.g., oil) and gas (e.g., carbon dioxide gas and hydrocarbon gas). The resource and the gas are separated, and then the gas can be further separated into the carbon dioxide gas and the hydrocarbon gas. The separation can be accomplished, for example, by using a column separator containing a carbonate solution. The carbon dioxide gas is reacted with the carbonate solution to form a bicarbonate that can be injected into the well with the acid to start the cycle again.

Additionally, in order to facilitate facile carbon dioxide absorption into the resource (e.g., oil) within in the reservoir, an amine solution can be introduced with the bicarbonate. In an embodiment, the amine solution can be injected into the reservoir before injection of the bicarbonate solution or injected into the reservoir together with the injection of the bicarbonate solution. Another method of introducing an amine is through spiking the amine in the carbonate solution as the bicarbonate is formed through reaction of carbonate and carbon dioxide.

FIG. 1 illustrates a system 100 that facilitates artificial pressurization in a reservoir 106. Artificial pressurization is based on pressure that builds up within the reservoir 106 due to the production of carbon dioxide gas. For example, the production of carbon dioxide gas in the water layer 108 can pressurize the reservoir 106. The carbon dioxide gas can also be produced in the reservoir 106 to pressurize the reservoir. In either situation, the carbon dioxide gas can be produced via a reaction between a bicarbonate 102 compound and an acid 104 (e.g., an acid solution).

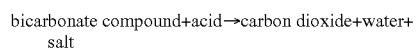

The bicarbonate 102 compound can be any compound of bicarbonate and an alkali metal or an alkali earth metal. The acid 104 can be any type of mineral acid or organic acid. Examples of such mineral acids and organic acids include hydrochloric acid (HCl), sulfuric acid ($H_2SO_4$) and acetic acid ($CH_3COOH$). An excess of acid can be used to acidify the water layer 108 to reduce the likelihood that carbon dioxide will be dissolved in the water layer 108.

In an embodiment, the bicarbonate 102 compound is baking soda ($NaHCO_3$) and the acid is hydrochloric acid (HCl). The reaction is:

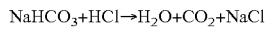

The system 100 that facilitates a reaction between a bicarbonate 102 compound and an acid 104 to form carbon dioxide requires one mole of the acid 104. Previous solutions for forming carbon dioxide have employed a carbonate compound (e.g., soda ash, $Na_2CO_3$) and two moles of the acid (e.g., hydrochloric acid, HCl) to form the carbon dioxide.

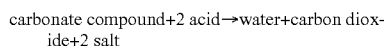

Accordingly, to produce one mole of carbon dioxide, the bicarbonate 102 compound reaction requires half as much acid 104 as the carbonate compound reaction. Using the bicarbonate 102 compound rather than the carbonate compound reduces the operational costs and increases the economic sustainability of the well.

The bicarbonate 102 compound and the acid 104 can be injected (or pumped) into the reservoir 106 or the water layer 108 through one or more injection wells (represented by injection well 110). In an embodiment, the bicarbonate 102 compound and the acid 104 can be injected through separate injection wells. The injections of the bicarbonate 102 compound and the acid 104 can occur at about the same time through separate injection wells. The injections of the bicarbonate 102 compound and the acid 104 can also occur at different times (e.g., sequentially) through separate injection wells. In another embodiment, the bicarbonate 102 and the acid 104 can be injected sequentially through the same injection well.

After (or during) injection of the bicarbonate 102 compound and the acid 104, the injection well(s) 110 can be sealed to prevent the carbon dioxide produced from the reaction of the bicarbonate 102 compound and the acid 104 from escaping. Whether sealed during or after injection of the bicarbonate 102 compound, the injection well(s) 110 are sealed in a manner to substantially contain pressure build-up from the production of carbon dioxide gas within the reservoir 106. In other words, when there is more than one injection well 110, all the injection wells are closed except the active injection well(s) 110 through which the bicarbonate 102 compound and/or the acid 104 are injected (or pumped). The sealed injection well(s) 110 help ensure that a maximal amount of the carbon dioxide gas is absorbed into the oil in the reservoir 106.

As carbon dioxide gas builds up in the reservoir 106, the pressure of the reservoir 106 increases. As the carbon dioxide gas s absorbed into the oil in the reservoir 106, the pressure of the reservoir 106 decreases. In other words, the reservoir 106 experiences a pressure drop. After the pressure drop, the oil and gas are ready to be removed from the reservoir 106.

In an embodiment, to facilitate facile carbon dioxide absorption into the resource (e.g., oil) within the reservoir 110, an amine 112 solution can be injected (or pumped) into the reservoir 106 through injection well 110. The amine 112 solution can be injected into the reservoir 106 before injection of the bicarbonate 102 compound or injected into the reservoir 106 together with the injection of the bicarbonate 102 compound. Like the carbon dioxide, the amine 106 is also absorbed into the oil.

As the oil absorbs the carbon dioxide, the viscosity decreases increasing the mobility of the oil. Oil with absorbed carbon dioxide also becomes more polar. The decreased viscosity and increased polarity allow the oil with absorbed carbon dioxide to be more compatible with water. The amine 112 is water soluble and has both hydrophilic and organophillic properties, which can further enhance oil production of the well. Examples of amine 112 compounds that can be used to enhance the oil production include, but are not limited to, ethanol-amine, propanol-amino or tetra alkyl ammonium hydroxide.

The organophillic group of the amine 112 can facilitate absorption of the amine into the oil such that the oil can be decorated with base groups. The base groups can increase the rate of carbon dioxide absorption into the oil, and can also increase the quantity of the carbon dioxide absorbed into the oil by further reducing the viscosity of the oil. As the carbon dioxide (and the amine 112) is absorbed in the oil, the pressure drop occurs over a time period of one day or more. However, holding the removal of the oil from the reservoir 106 for a longer time can ensure the absorption of more carbon dioxide. For example, in an embodiment, the hold time can be two days or more. In another embodiment, the hold time can be five days or more. In a further embodiment, the hold time can be ten days or more.

System 100 can include a sensor that is included on the injection well 110 that can be connected to a computer on the surface to detect when the pressure of the reservoir 106 has dropped a level that indicates that the carbon dioxide absorbed and less viscose oil can be removed from the reservoir 106. The sensor can ensure the maximum absorption of the carbon dioxide within the oil before the oil is removed.

Figure 2:
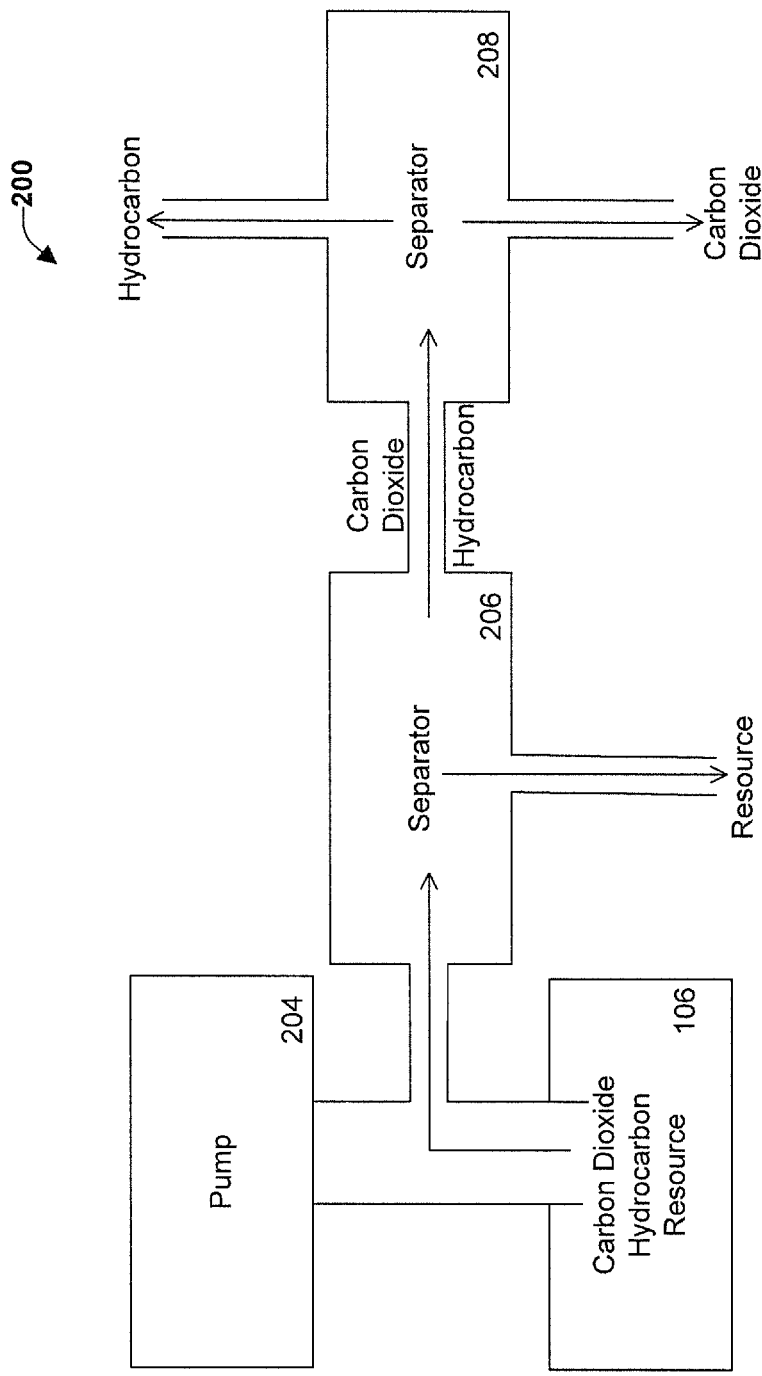
FIG. 2 is a schematic block diagram representation of a system for recycling carbon dioxide produced by a well, according to an aspect of the disclosure.
Figure 3:
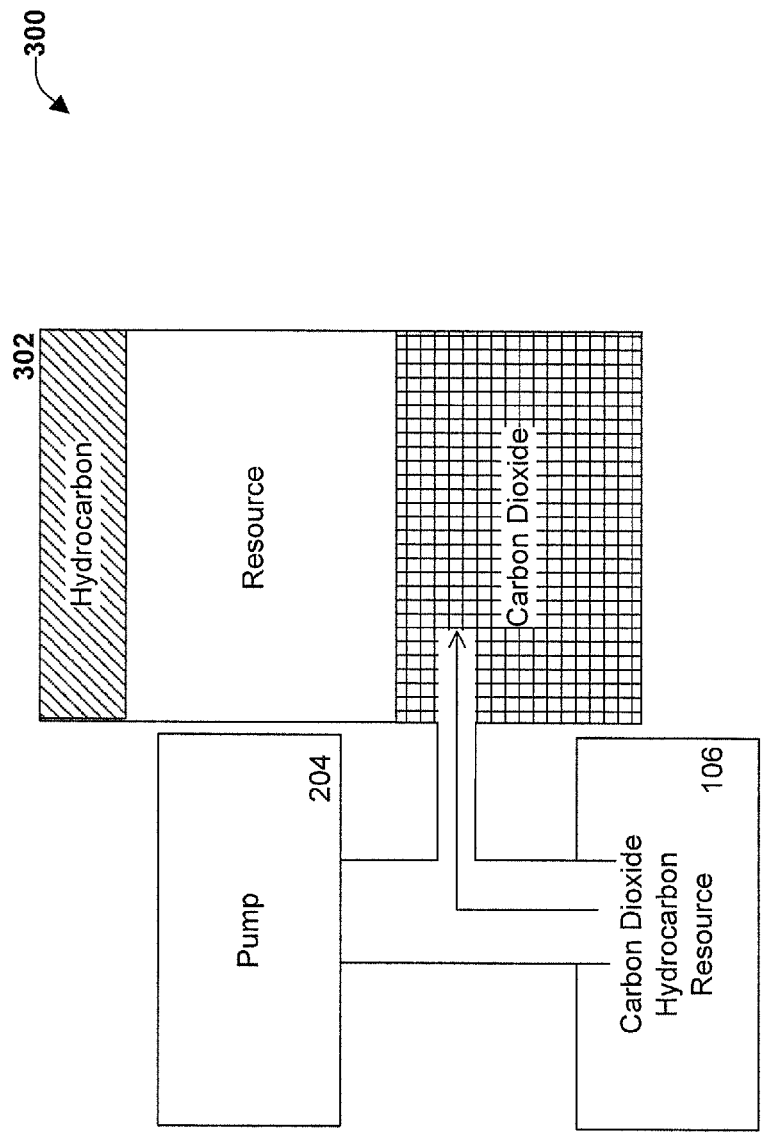
FIG. 3 is a schematic block diagram representation of another system for recycling carbon dioxide produced by a well, according to an aspect of the disclosure.
Figure 4:
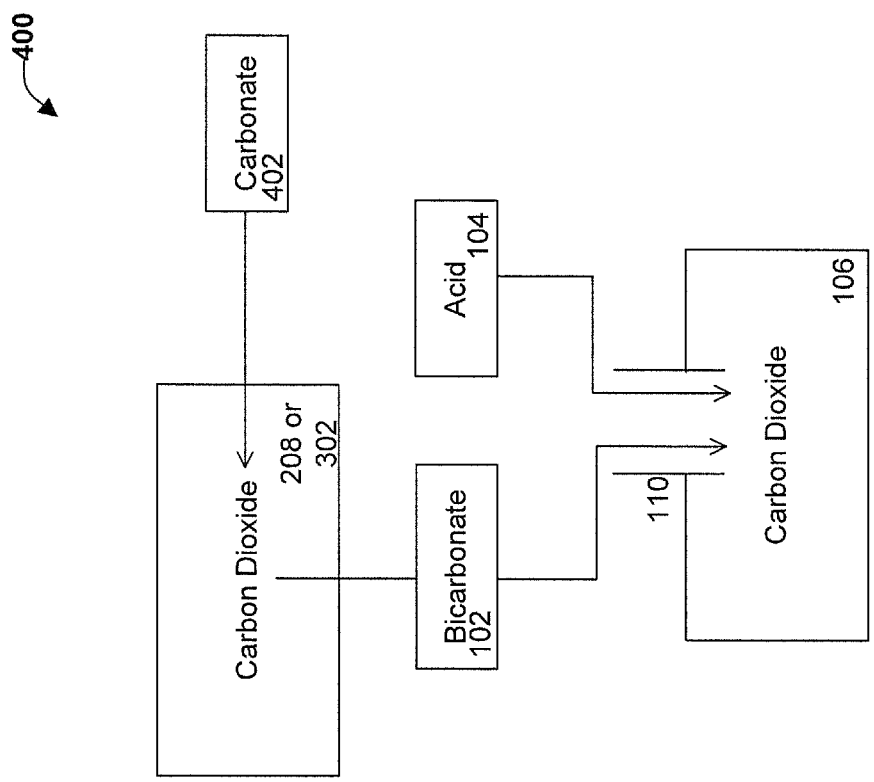
FIG. 4 is a schematic block diagram representation of a system for producing bicarbonate using recycled carbon dioxide, according to an aspect of the disclosure.

After the oil and absorbed carbon dioxide are removed from the reservoir 106, the carbon dioxide can be recycled to facilitate further removal of oil from the reservoir 106. Systems that can be employed for a recycling process are shown in FIGS. 2, 3 and 4. Recycling the carbon dioxide provides several benefits. First, the recycling of carbon dioxide into bicarbonate can reduce the cost of raw materials and further decrease the operational costs of the process. Additionally, the recycling of carbon dioxide is environmentally friendly, since the amount of carbon dioxide that is released to the atmosphere is decreased compared to situations where recycling is not practiced.

FIG. 2 is a schematic block diagram representation of a system 200 for recycling carbon dioxide produced by a well, according to an aspect of the disclosure. The resource (oil) can be removed from the reservoir 106 with absorbed carbon dioxide gas and absorbed hydrocarbon gas. A pump 204 (or pump jack) can be employed to facilitate removal of the oil and absorbed components from the reservoir 106.

A stream can be removed from the reservoir 106 with the assistance of pump 204. The stream can contain the resource (e.g., oil) in liquid form with absorbed gasses. The absorbed gasses can include carbon dioxide gas and hydrocarbon gas. The carbon dioxide gas can be present in a greater part than the hydrocarbon gas. The hydrocarbon gas can include methane, C2 hydrocarbons, C3 hydrocarbons, or other residual components, such as residual acid. The stream can undergo a separation process in separator 206 to separate the resource from the gasses.

Separator 206 can include one or more gas-liquid separator. The gas-liquid separator can be any type of separator that can separate gasses from liquids. Examples of gas-liquid separators include cryogenic separators, chemical separators, condenser separators, column separators, cylindrical cyclone separators, and the like. Separator 206 can be any separator that can separate the stream into a liquid resource stream and a gas stream that includes the carbon dioxide gas and the hydrocarbon gas.

The gas stream can be further separated by separator 208 into carbon dioxide gas and hydrocarbon gas. Separator 208 can be any type of separator that can facilitate the separation of the gasses. For example, separator 208 can be a gas-liquid separator as described above. One of the gasses can be absorbed into a liquid and the other gas can be separated from the liquid with the absorbed gas. The hydrocarbon gas can be collected for further processing (e.g., as a commercial product), while the carbon dioxide gas can be recycled, as shown in FIG. 4.

As shown in FIG. 3, separators 206 and 208 can be a single separator 302. The separator 302 can be any type of separator that can facilitate the separation of the oil from the carbon dioxide gas and the hydrocarbon gas in a single step. One example, as shown in FIG. 3, is a column reactor or separator. In an example, the oil with the absorbed carbon dioxide and hydrocarbon gas can be brought into a carbonate solution. The carbon dioxide can react with the carbonate solution to form bicarbonate. The oil can be held in a decanter and the hydrocarbon gas can escape through a pipeline for further processing.

FIG. 4 is a schematic block diagram representation of a system 400 for producing bicarbonate using recycled carbon dioxide, according to an aspect of the disclosure. In system 400, separator 208 or 302 is a gas-liquid separator that utilizes a solution of carbonate 402 to separate the carbon dioxide gas from the hydrocarbon gas (and the resource). For example, in FIG. 3, the bottom of separator 302 can be filled with carbonate 402.

The carbonate 402 solution captures the carbon dioxide gas, but not the hydrocarbon gas (or the resource). The carbon dioxide can react with the carbonate 402 solution to facilitate formation of the bicarbonate 102 compound of FIG. 1. The hydrocarbon gas can be separated from the carbon dioxide gas and further processed and commercialized.

The bicarbonate 102 compound can be injected to the reservoir 106 (or the water layer 108 of FIG. 1) through an injection well 110. The acid 104 can be injected into the reservoir 106 through a separate injection well 110 or sequentially through the same injection well 110 as the bicarbonate 102 compound. The bicarbonate 102 compound and the acid 104 can react to form the carbon dioxide that can pressurize the reservoir 106 as described with respect to FIG. 1.

Recycling the carbon dioxide gas facilitate formation of the bicarbonate 102 compound from the carbonate 302 solution. The bicarbonate 102 compound is more expensive than carbonate 302. For example, baking soda is more expensive than soda ash. Therefore, recycling the carbon dioxide to produce the bicarbonate 102 compound reduces the operational cost of the well and increases the economic sustainability of the well.

By means of example and not limitation, when the bicarbonate compound is sodium bicarbonate ($NaHCO_3$), the carbonate compound is sodium carbonate ($Na_2CO_3$), and the acid is hydrogen chloride (HCl), the amount of acid and sodium carbonate necessary to facilitate carbon dioxide production in the reservoir is reduced when carbon dioxide is recycled.

To produce sodium bicarbonate, the reaction in separator 208 is:

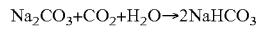

Accordingly, two moles of sodium bicarbonate are produced from one mole of sodium carbonate and one mole of carbon dioxide.

Then, upon combination with acid, carbon dioxide can be formed to pressurize reservoir 106 as follows:

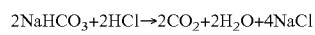

Therefore, with recycling of the carbon dioxide, two moles of carbon dioxide can be produced from one mole of sodium carbonate use. Compared to a situation without recycling, to produce two moles of carbon dioxide from sodium carbonate, two moles of sodium carbonate and four moles of hydrochloric acid are needed. Overall, when carbon dioxide is recycled, half as much hydrochloric acid and half as much sodium carbonate are necessary to produce the same amount of carbon dioxide.

It will be understood that in order not to release carbon dioxide from the resource with absorbed carbon dioxide when the resource with absorbed carbon dioxide (e.g., oil with absorbed hydrocarbons and carbon dioxide), the reservoir 106 pressure can be maintained at a certain pressure level. To maintain the pressure level in the reservoir 106 while the resource with absorbed carbon dioxide is removed, bicarbonate 102 compound and acid 104 can be supplied (e.g., injected) to the well once the well is opened to remove the resource with absorbed carbon dioxide.

FIGS. 5-9 illustrate methods 500-900 illustrated as flow diagrams (process flow charts). For simplicity of explanation, the methods 500-900 are depicted and described as a series of acts. However, the methods 500-900 are not limited by the acts illustrated or by the order of the acts illustrated. For example, acts can occur in various orders and/or concurrently and with other acts not presented or described herein. Furthermore, not all illustrated acts need be required to implement the methods. Methods 400-700 can be employed by one or more of systems 100-400 or similar systems. In methods 500-900, the general term "well" is meant to include the reservoir that holds the resource and/or the water layer below the reservoir.

Figure 5:
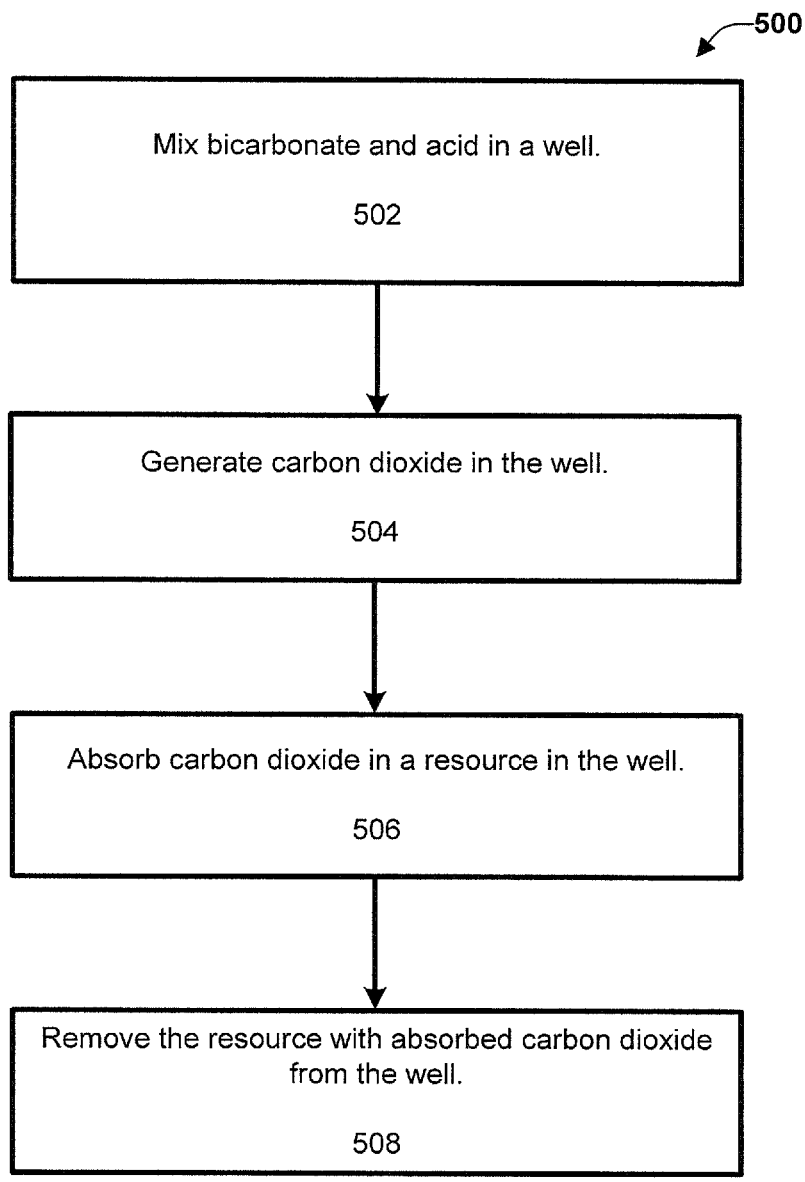
FIG. 5 is a schematic process flow diagram of illustrative acts of a method for increasing resource production of a well, according to an aspect of the disclosure.

FIG. 5 is a schematic process flow diagram of illustrative acts of a method 500 for increasing resource production of a well, according to an aspect of the disclosure. Method 500 can artificially pressurize the reservoir and decrease the viscosity of the resource to facilitate increased resource production from the well either by injecting bicarbonate and acid into the reservoir or into the water layer to facilitate formation of carbon dioxide in the reservoir. Artificial pressurization is based on pressure that builds up within the reservoir due to the production of carbon dioxide gas.

At element 502, a bicarbonate compound and an acid are mixed in the well. The bicarbonate compound and the acid can be injected into the well through one or more injection wells. In an embodiment, the bicarbonate compound and the acid can be injected through separate injection wells. The injections of the bicarbonate compound and the acid can occur at about the same time through separate injection wells. The injections of the bicarbonate compound and the acid can also occur at different times (e.g., sequentially) through separate injection wells. In another embodiment, the bicarbonate and the acid can be injected sequentially through the same injection well. The bicarbonate compound and the acid can be mixed in the well after the injections. The term "mixed" is used to mean "combined."

The bicarbonate compound can be any compound of bicarbonate and an alkali metal or an alkali earth metal. The acid can be any type of mineral acid or organic acid. Examples of mineral acids and organic acids that can be utilized in method 500 are hydrochloric acid (HCl), sulfuric acid ($H_2SO_4$) and acetic acid ($CH_3COOH$). In an embodiment, the bicarbonate compound is baking soda ($NaHCO_3$) and the acid is hydrochloric acid (HCl).

At element 504, carbon dioxide gas is generated in the well. The carbon dioxide gas is generated upon the mixing of the bicarbonate compound and the acid via a reaction between the bicarbonate compound and the acid.

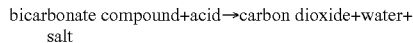

bicarbonate compound+acid→carbon dioxide+water+salt

The carbon dioxide gas can increase pressure in the well. In an embodiment, after injection of the bicarbonate compound and the acid, the injection wells can be sealed to facilitate the pressure increase due to the carbon dioxide and to ensure that a maximal amount of the carbon dioxide gas is absorbed into the resource.

As carbon dioxide builds up in the reservoir, the pressure of the reservoir increases. At element 506, the carbon dioxide gas is absorbed in the resource in the well. As the carbon dioxide is absorbed by the resource, the pressure in the well decreases (the well experiences a pressure drop). After the pressure drop, the oil and gas are ready to be removed from the well. In an embodiment, the carbon dioxide gas can be allowed to absorb in the resource for a hold period greater than one day (24 hours). The hold period can be varied to increase the absorption of the carbon dioxide gas into the resource. For example, in an embodiment, the hold time can be two days or more. In another embodiment, the hold time can be five days or more. In a further embodiment, the hold time can be ten days or more. At element 508, the resource with the absorbed carbon dioxide can be removed from the well after the hold period.

Figure 6:
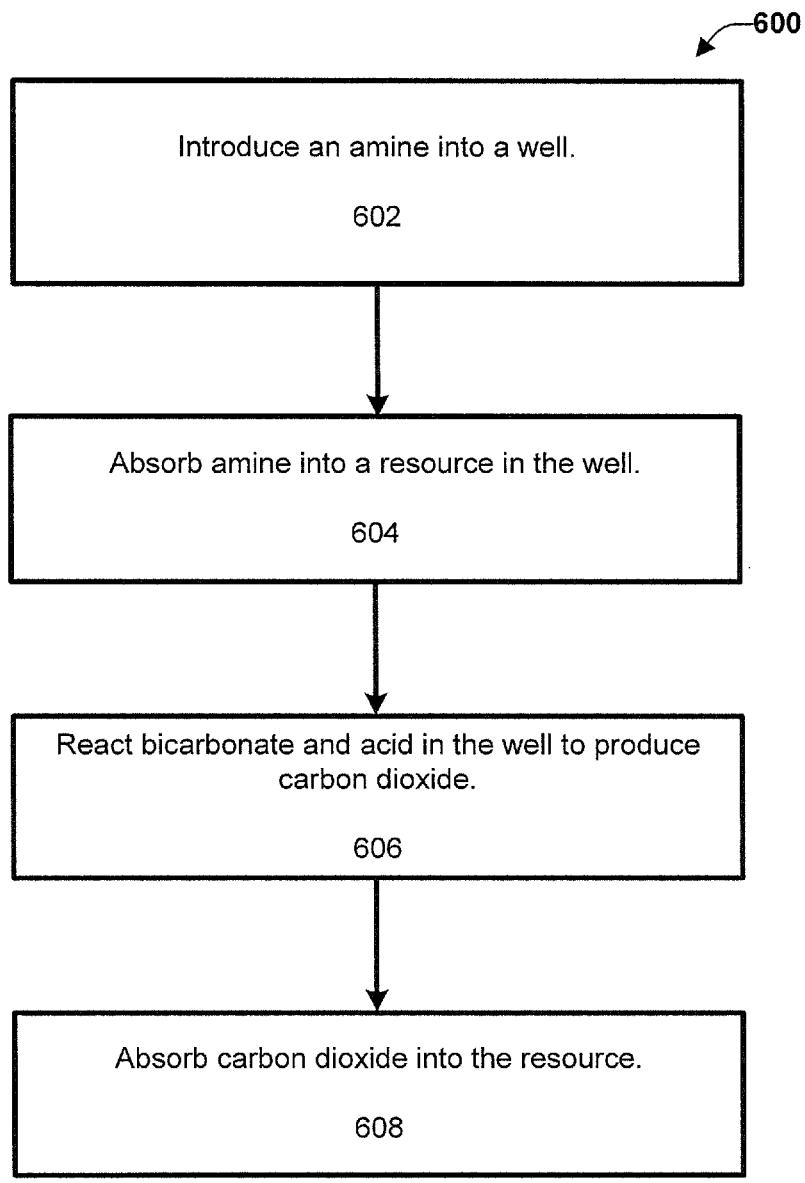
FIG. 6 is a schematic process follow diagram of illustrative acts of a method for increasing carbon dioxide absorption into a resource within a well, according to an aspect of the disclosure.

FIG. 6 is a schematic process follow diagram of illustrative acts of a method 600 for increasing carbon dioxide absorption into a resource within a well, according to an aspect of the disclosure. Examples of amine compounds that can be used to increase the carbon dioxide absorption into the resource include, but are not limited to, ethanol-amine, propanol-amine or tetra alkyl ammonium hydroxide.

To facilitate the carbon dioxide absorption into the resource within the reservoir, at element 602, an amine is injected into the well. The amine can be injected into the well, pumped into the well, or any other means of introduction into the well. For example, the amine can be introduced into the well before the bicarbonate that is used to form carbon dioxide. In another example, the amine can be introduced with the bicarbonate. Another method of introducing the amine is through spiking the amine concentration in a carbonate solution as the bicarbonate is formed through a reaction of carbonate and carbon dioxide.

After the introduction of the amine into the well, at element 604, the amine can be absorbed into a resource in the well. Either after the absorption of the amine into the resource, at the same time as the absorption of the amine into the resource, or before the absorption of the amine into the resource, at element 606, bicarbonate and acid can be reacted to produce carbon dioxide. At element 608, the carbon dioxide can be absorbed into the resource. The carbon dioxide can be absorbed into the resource before, during or after the absorption of the amine into the resource.

As the resource absorbs the carbon dioxide, the viscosity decreases increasing the mobility of the resource. The resource with absorbed carbon dioxide also becomes more polar. The decreased viscosity and increased polarity allow the resource with absorbed carbon dioxide to be more compatible with water. The amine is water soluble and has both hydrophilic and organophillic properties, which can further enhance oil production of the well.

The organophillic group of the amine can facilitate absorption of the amine into the resource such that the resource can be decorated with base groups. The base groups can increase the rate of carbon dioxide absorption into the resource, and can also increase the quantity of the carbon dioxide absorbed into the oil by further reducing the viscosity of the oil. As the carbon dioxide (and the amine) is absorbed in the resource, the pressure drop occurs that can signal the removal of the resource from the well.

Figure 7:
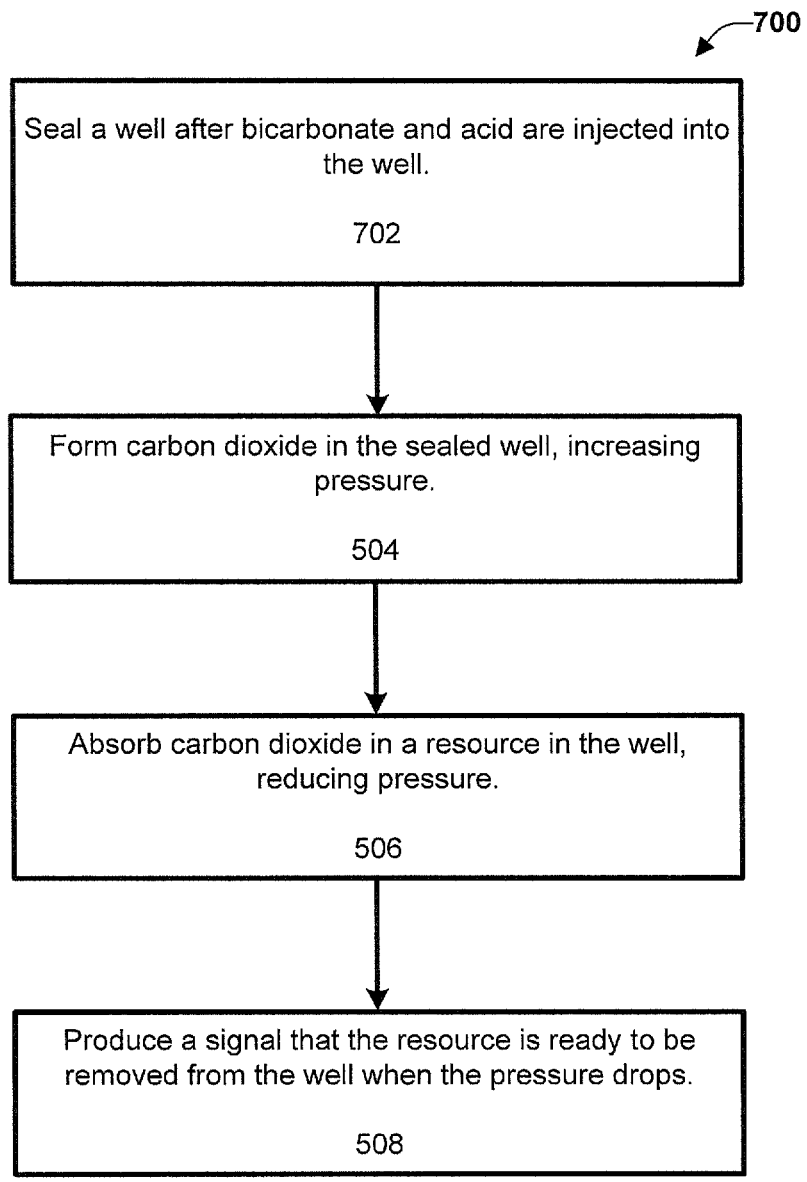
FIG. 7 is a schematic process flow diagram of illustrative acts of a method for revitalizing an abandoned well by increasing resource production, according to an aspect of the disclosure.

FIG. 7 is a schematic process flow diagram of illustrative acts of a method 700 for revitalizing an abandoned well by increasing resource production, according to an aspect of the disclosure. A bicarbonate compound and an acid can be injected into the well through one or more injection wells and combined in the well after the injections. The bicarbonate compound can be any compound of bicarbonate and an alkali metal or an alkali earth metal. The acid can be any type of mineral acid. Examples of mineral acids are hydrochloric acid (HCl) and sulfuric acid ($H_2SO_4$). In an embodiment, the bicarbonate compound is baking soda ($NaHCO_3$) and the acid is hydrochloric acid (HCl).

At element 702, the well (e.g., the injection wells going into the reservoir) can be sealed after the bicarbonate compound and the acid are injected into the well. At element 704, carbon dioxide gas is generated in the reservoir upon the mixing of the bicarbonate compound and the acid via a reaction between the bicarbonate compound and the acid. The formation of the carbon dioxide gas increases the pressure of the well (in other words, increases the pressure of the reservoir).

At element 706, the carbon dioxide gas is absorbed by the resource in the well. The sealed well can facilitate the absorption of the carbon dioxide gas into the resource by decreasing the amount of carbon dioxide that can escape from the reservoir. The carbon dioxide gas absorbed in the reservoir reduces the pressure of the well. The pressure drop occurs over a time period of one day or more. However, holding the removal of the oil from the reservoir for a longer time can ensure the absorption of more carbon dioxide.

At element 708, a signal is produced that the resource is ready to be removed from the well when the pressure drops. The pressure drop can be recorded by a sensor on the well that is connected to a computer on the surface. The sensor connected with a computer can be utilized to detect when the pressure of the reservoir has dropped a level that indicates that the oil and absorbed carbon dioxide gas can be removed from the reservoir with a maximal absorption of the carbon dioxide gas.

Figure 8:
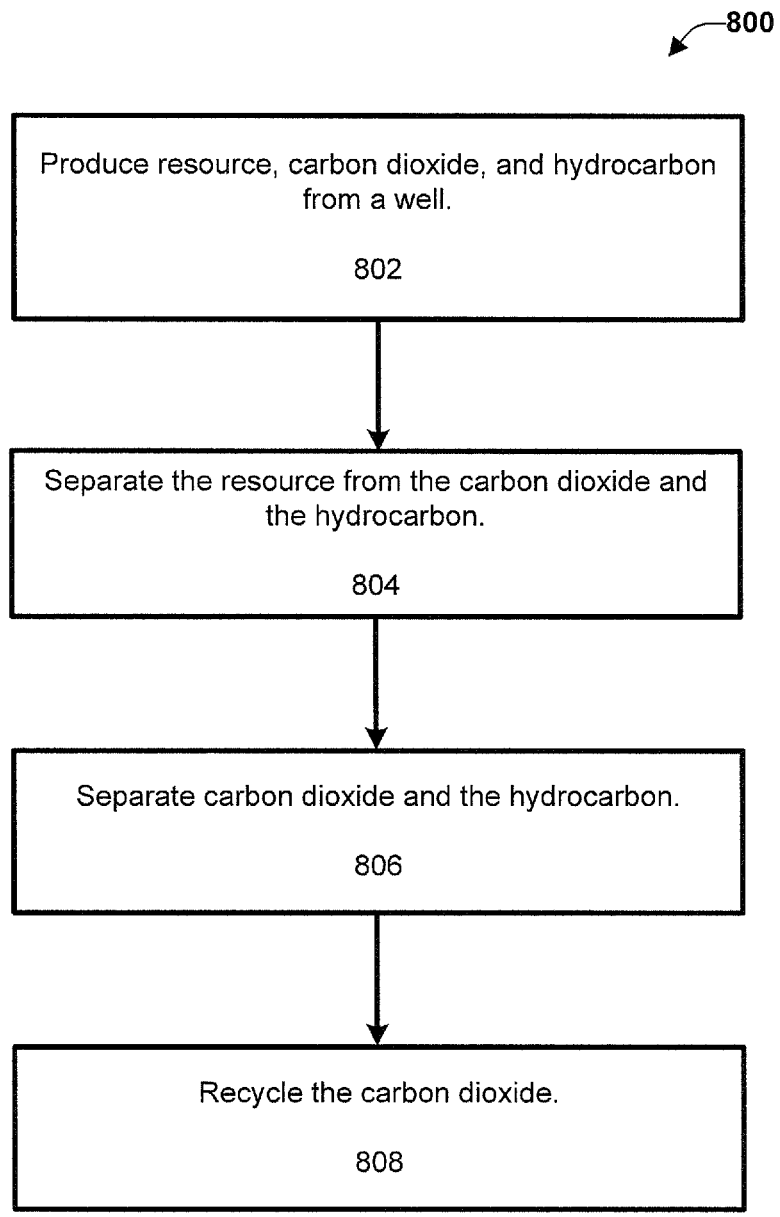
FIG. 8 is a schematic process flow diagram of illustrative acts of a method for recycling carbon dioxide produced by a well, according to an aspect of the disclosure.

FIG. 8 is a schematic process flow diagram of illustrative acts of a method 800 for recycling carbon dioxide produced by a well, according to an aspect of the disclosure. At element 802, the liquid resource and absorbed carbon dioxide gas are removed from the reservoir (or produced from a well). The liquid resource can also have absorbed hydrocarbon gas components. The carbon dioxide gas can be recycled to facilitate further removal of the resource from the reservoir. Recycling the carbon dioxide has provides several benefits, including reducing the cost of raw materials and decreasing the amount of carbon dioxide gas released into the atmosphere.

At element 804, the liquid resource is separated from the carbon dioxide gas and the hydrocarbon gas. The separation can be accomplished via a liquid-gas separator. The liquid resource is retrieved for commercial purposes. The gasses can be further separated by another separation process. At element 806, the carbon dioxide gas and the hydrocarbon gas and separated. The hydrocarbon gas can be further processed and commercialized. The carbon dioxide gas, at element 808, can be recycled. It will be understood that elements 804, 806 and 808 can refer to separate stages of method 800 or can refer to elements of a single stage of element 800 (e.g., occurring in a column reactor with a carbonate solution).

The carbon dioxide gas can be recycled using a carbonate solution. The carbonate solution captures the carbon dioxide gas, but not the hydrocarbon gas. The carbon dioxide can react with the carbonate solution to facilitate formation of the bicarbonate compound that can be used in the production of further carbon dioxide in the well.

In order not to release carbon dioxide from the resource with absorbed carbon dioxide when the resource with absorbed carbon dioxide (e.g., oil with absorbed hydrocarbons and carbon dioxide), the reservoir pressure can be maintained at a certain pressure level. To maintain the pressure level in the reservoir while the resource with absorbed carbon dioxide is removed, bicarbonate compound and acid 104 can be supplied (e.g., injected) to the well once the well is opened to remove the resource with absorbed carbon dioxide.

Figure 9:
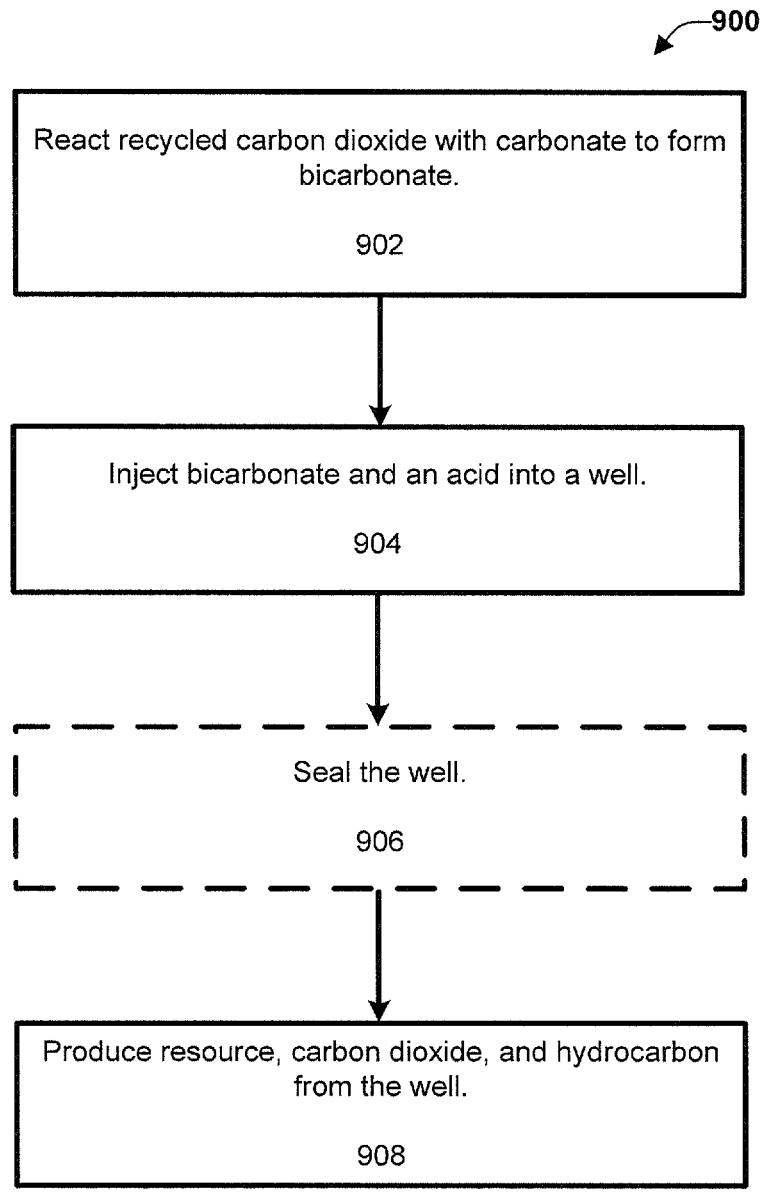
FIG. 9 is a schematic process flow diagram of illustrative acts of a method for producing bicarbonate using recycled carbon dioxide to increase production of a well, according to an aspect of the disclosure.

FIG. 9 is a schematic process flow diagram of illustrative acts of a method 900 for producing bicarbonate using recycled carbon dioxide to increase production of a well, according to an aspect of the disclosure. At element 902, recycled carbonate is reacted with carbonate to form bicarbonate. Using the recycled carbon dioxide to facilitate production of bicarbonate reduces the operational costs of the well due to the raw material cost. Carbonate is generally less expensive than bicarbonate.

At element 904, the bicarbonate and acid are injected into a well. The bicarbonate compound and the acid can be injected into the well through one or more injection wells. In an embodiment, the bicarbonate compound and the acid can be injected through separate injection wells. The injections of the bicarbonate compound and the acid can occur at about the same time through separate injection wells. The injections of the bicarbonate compound and the acid can also occur at different times (e.g., sequentially) through separate injection wells under sealed system to prevent carbon dioxide from escaping. In another embodiment, the bicarbonate and the acid can be injected sequentially through the same injection well. The bicarbonate compound and the acid can be mixed in the well after the injections. The term "mixed" is used to mean "combined" or "reacted."

Carbon dioxide gas is generated in the well upon the mixing of the bicarbonate compound and the acid via a reaction between the bicarbonate compound and the acid.

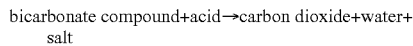

The carbon dioxide gas can increase pressure in the well. In an optional embodiment, before or during injection of the bicarbonate compound and the acid, at element 908, the injection wells can be sealed to facilitate the pressure increase due to the carbon dioxide and to ensure that a maximal amount of the carbon dioxide gas is absorbed into the resource.

After a hold time greater than 24 hours or upon a signal from a sensor, at element 708, the resource with absorbed carbon dioxide gas and hydrocarbon has are produced by the well while maintaining a certain pressure. The resource and absorbed gasses can be separated. The absorbed gasses can be further separated to facilitate the recycling of carbon dioxide.

The separation can occur as a single step. For example, the separation can occur in a column separator with carbonate solution that removes the carbon dioxide. The resource and the hydrocarbon gas are separated, for example, by evaporation of the hydrocarbon gas.

With respect to any numerical range for a given characteristic, a parameter from one range may be combined with a parameter from a different range for the same characteristic to generate a numerical range. Other than where otherwise indicated, all numbers, values and/or expressions referring to quantities of ingredients, reaction conditions, etc., used in the specification and claims are to be understood as modified in all instances by the term "about."

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A system, comprising:
    a well that provides a stream comprising resource components, carbon dioxide gas components and hydrocarbon gas components; and
    a gas-liquid separator that facilitates separation of the resource components, the carbon dioxide gas components and the hydrocarbon gas components from the stream,
    wherein the gas-liquid separator comprises a carbonate-containing solution that facilitates a reaction between the carbonate-containing solution and the carbon dioxide gas component, the carbonate-containing solution comprises sodium carbonate and the reaction produces sodium bicarbonate.

2. The system of claim 1, wherein the reaction produces a bicarbonate compound that is injected into the well.

3. The system of claim 2, wherein an amine is injected into the well before or at the same time as the bicarbonate compound is injected into the well.

4. The system of claim 2, wherein an acid is injected to the well to facilitate a reaction with the bicarbonate compound to produce carbon dioxide in the well.

5. The system of claim 4, wherein the well is sealed to facilitate absorption of the carbon dioxide in the resource.

6. The system of claim 1, wherein the gas-liquid separator comprises a column separator comprising the carbonate-containing solution.

7. A method, comprising
    injecting a bicarbonate compound and an acid into a well;
    combining the bicarbonate compound and the acid;
    generating carbon dioxide;
    absorbing the carbon dioxide into a resource within the well;
    removing the resource and the carbon dioxide from the well; and
    charging the resource and carbon dioxide to a gas-liquid separator that facilitates separation of the resource from the carbon dioxide,
    wherein the gas-liquid separator comprises a carbonate-containing solution that facilitates a reaction between the carbonate-containing solution and the carbon dioxide, the carbonate-containing solution comprises sodium carbonate and the reaction produces sodium bicarbonate.

8. The method of claim 7, further comprising sealing the well to facilitate the absorbing of the carbon dioxide into the resource.

9. The method of claim 7, further comprising injecting an amine into the well to facilitate the absorbing the carbon dioxide into the resource.

10. The method of claim 7, further comprising separating the carbon dioxide and the resource utilizing a separator.

11. The method of claim 10, further comprising reacting the carbon dioxide with a carbonate compound within the separator to produce the bicarbonate compound.

12. The method of claim 7, wherein the bicarbonate compound and the acid are injected into the well at the same time.

13. The method of claim 7, wherein the bicarbonate compound and the acid are injected into the well at different times.

14. The method of claim 7, wherein the removing further comprises removing the resource, the carbon dioxide, and a hydrocarbon gas from the well.

15. The method of claim 14, further comprising separating the resource, the carbon dioxide and the hydrocarbon gas.

16. The method of claim 7, further comprising lowering the viscosity of the resource via the absorbing the carbon dioxide.

17. A method, comprising:
forming carbon dioxide from a bicarbonate compound and an acid in a well to facilitate an increase in pressure in the well;
closing the well;
absorbing the carbon dioxide into a resource in the well to facilitate a decrease in a pressure of the well;
opening the well;
removing the resource and the carbon dioxide from the well; and
charging the resource and carbon dioxide to a gas-liquid separator that facilitates separation of the resource from the carbon dioxide,
wherein the gas-liquid separator comprises a carbonate-containing solution that facilitates a reaction between the carbonate-containing solution and the carbon dioxide, the carbonate-containing solution comprises sodium carbonate and the reaction produces sodium bicarbonate.

18. The method of claim 17, wherein the absorbing occurs for a time greater than about 24 hours.

19. The method of claim 17, wherein the closing the well occurs before the forming the carbon dioxide.

20. The method of claim 17, further comprising converting the removed carbon dioxide to the bicarbonate through a reaction with carbonate.

\* \* \* \* \*